US009426478B2

(12) United States Patent
Li et al.

(10) Patent No.: US 9,426,478 B2
(45) Date of Patent: Aug. 23, 2016

(54) RESOLUTION ROBUST VIDEO QUALITY METRIC

(71) Applicant: Cisco Technology Inc., San Jose, CA (US)

(72) Inventors: Zhi Li, Mountain View, CA (US); Josh Gahm, Newtonville, MA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 14/336,246

(22) Filed: Jul. 21, 2014

(65) Prior Publication Data

US 2016/0021380 A1 Jan. 21, 2016

(51) Int. Cl.
| | |
|---|---|
| *H04N 19/00* | (2014.01) |
| *H04N 19/36* | (2014.01) |
| *H04N 19/86* | (2014.01) |
| *H04N 17/00* | (2006.01) |
| *H04N 19/154* | (2014.01) |

(52) U.S. Cl.
CPC .............. *H04N 19/36* (2014.11); *H04N 17/004* (2013.01); *H04N 19/154* (2014.11); *H04N 19/86* (2014.11)

(58) Field of Classification Search
CPC .............................. H04N 19/36; H04N 19/154
USPC ................................................... 375/240.26
See application file for complete search history.

(56) References Cited

U.S. PATENT DOCUMENTS

| | | | |
|---|---|---|---|
| 7,869,517 B2 | 1/2011 | Ghanbari | |
| 2011/0090950 A1 | 4/2011 | Bush et al. | |
| 2011/0299593 A1 | 12/2011 | Pettersson et al. | |
| 2013/0044807 A1 | 2/2013 | Lamy-Bergot et al. | |
| 2013/0297743 A1* | 11/2013 | Eschet | H04L 65/60 709/219 |
| 2014/0201382 A1* | 7/2014 | Shivadas | H04L 65/605 709/231 |

OTHER PUBLICATIONS

Aug. 7, 2015 ISR and Written Opinion of ISA for PCT/IB2015/054313.
Olivia Nemethova et al., "Subjective Evaluation of Video Quality for H.264 Encoded Sequences" *Proceedings of SympoTIC, Bratislava Slovakia* (IEEE Oct. 2004).

* cited by examiner

*Primary Examiner* — Jeffrey Williams
(74) *Attorney, Agent, or Firm* — Samuel M. Katz

(57) ABSTRACT

In one embodiment, a video processing system includes a processor to read a mapping between a peak signal to noise ratio, PSNR, and a video quality metric, M, for an encoded version of a first video portion encoded at full resolution Rmax, read an up-sampled peak signal to noise ratio, uPSNR (Rx) of an up-sampled decoded video portion deriving from the first video portion being encoded at a resolution Rx, which is less than the full resolution Rmax, yielding an encoded video portion, the encoded video portion being decoded and then up-sampled to the full resolution Rmax; and lookup a value, V', that maps to uPSNR(Rx) in the mapping, V' representing a resolution normalized M value of the encoded video portion encoded at the resolution Rx. Related apparatus and methods are also described.

18 Claims, 7 Drawing Sheets

RESOLUTION ROBUST VIDEO QUALITY METRIC

TECHNICAL FIELD

The present disclosure relates generally to video quality metrics.

BACKGROUND

In video streaming applications, it may be important to determine a measure of the quality of the video delivered to end-users. Such a metric may help gauge user satisfaction. Additionally, when combined with other information (such as video bitrate), it may be used to optimize users' viewing experience given the same bandwidth resource, or maintain the same level of viewing experience while packing more users within the same bandwidth.

An ideal video quality metric typically has a high degree of accuracy, in that the generated quality score closely matches the quality perceived by end users. Additionally, an ideal video quality metric is typically easy to compute, so that it may even be applied in real-time applications such as live streaming.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
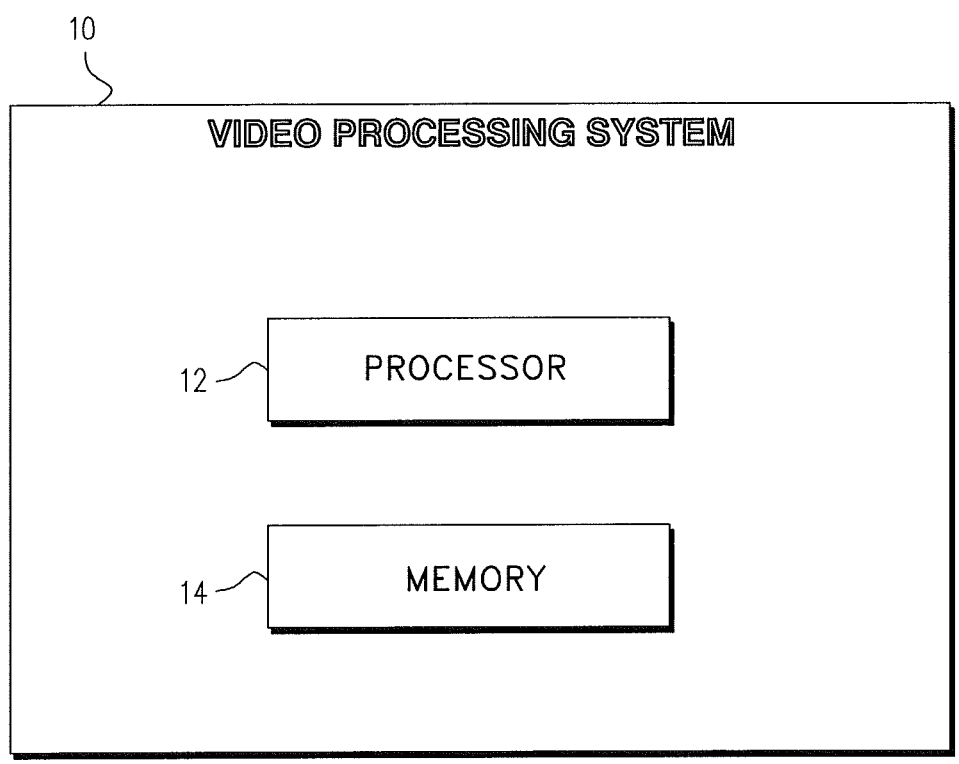
FIG. 1 is a block diagram view of a video processing system constructed and operative in accordance with an embodiment of the present invention.

There is provided in accordance with an embodiment of the present invention, a video processing system including a processor, and a memory to store data used by the processor, wherein the processor is operative to read, from the memory, a mapping between a peak signal to noise ratio, PSNR, and a video quality metric, M, for an encoded version of a first video portion encoded at full resolution Rmax, read, from the memory, an up-sampled peak signal to noise ratio, uPSNR (Rx), of an up-sampled decoded video portion, the up-sampled decoded video portion deriving from the first video portion being encoded at a resolution Rx, which is less than the full resolution Rmax, yielding an encoded video portion, the encoded video portion being decoded and then up-sampled to the full resolution Rmax, and lookup a value, V', that maps to uPSNR(Rx) in the mapping V' representing a resolution normalized M value of the encoded video portion encoded at the resolution Rx.

Description Continued

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, H.265 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;
compressed, but neither scrambled nor encrypted;
scrambled or encrypted, but not encoded;
scrambled or encrypted, but not compressed;
encoded, and scrambled or encrypted; or compressed, and scrambled or encrypted.

Likewise, the terms "decoded" and "decompressed" on the one hand, and the terms "descrambled" and "decrypted" on the other hand, are used to refer to different and exclusive types of processing.

By way of introduction, peak signal-to-noise ratio (PSNR) is a widely used quality metric for images and video. Despite the many limitations it has (for example, PSNR works poorly across different video content), it remains an effective tool for quality evaluation for lossy encoding.

Peak signal-to-noise ratio (PSNR), is the ratio between the maximum possible power of a signal and the power of corrupting noise that affects the fidelity of its representation. It should be noted that the maximum possible power is not the power of the original signal, but the maximum power over all possible signals. For example, an 8-bit picture pixel can have a maximum value of 255, so the maximum possible power of the 8-bit picture pixel is $255^2$.

Another category of metrics, linked to encoding, attempts to deal with the distortion incurred by lossy encoding. This second category of metrics typically uses the quantization parameter (QP) to indicate the quality. However, since human vision is less sensitive to distortion in high-complexity/high motion scenes, the QP values are generally normalized by complexity and motion of the video content. Different metrics in this category may differ in how the complexity and motion components are calculated, but the general principles remain basically the same. These metrics are typically easier to compute and generally do not incur too much additional computation than the encoding itself. An example of another metric in this category includes the constant rate factor (CRF) used in x264 (x264 is a general public license free software library for encoding video streams into H.264/MPEG-4). This class of metrics does not deal with distortion due to resampling so that two videos with the same content but very different spatial resolution may have the same score.

The complexity/motion-normalized QP is a reasonably good measure for modeling the subjective quality due to lossy encoding and works well for comparing video quality across different content. However, as stated above, complexity/motion-normalized QP is unable to take into account the distortion due to resampling, as videos with different resolutions may end up with different subjective quality after up-sampling, even if they have the same complexity/motion and are encoded with the same QP.

Reference is now made to FIG. 1, which is a block diagram view of a video processing system 10 constructed and operative in accordance with an embodiment of the present invention.

The video processing system 10 includes a processor 12 and a memory 14 to store data used by the processor 12.

The video processing system 10 is operative to calculate a resolution normalized video quality metric based on a combination of a peak-signal-to-noise ratio (PSNR) and a video metric M (such as QP) or a complexity-motion normalized video metric M, for example, but not limited to, a complexity-motion normalized quality metric based on QP (such as constant rate factor (CRF).

The calculation of the resolution normalized video quality metric is described in more detail with reference to FIGS. 2-5, but in overview, the processor 12 of the video processing system 10 calculates the resolution normalized video quality metric of a video portion (either a single video frame or a sequence of video frames) based on an up-sampled PSNR (uPSNR) of the video portion and a mapping between PSNR and the (complexity-motion normalized) video metric M at full resolution for the same video portion.

In some implementations, the transcoding device may actually encode a lightly compressed "mezzanine" format (somewhere between the original video and the encoded video encoded for serving/broadcasting to the clients) rather than the actual, full-reference original. So for example, a live program might be taken from the cameras at almost 1 Gbps and then compressed by lossy compression to get the bitrate down to, say, 30 Mbps before the video is sent to the transcoders. This lightly compressed format is still of a much higher quality than the quality that will be sent to the end-user, but it does not have the same quality as the full-reference original. Nevertheless, it is possible to use this lightly compressed input to the encoders as if it were the actual original full-reference in order to estimate the quality degradation that is occurring during transcoding. Therefore, the video portion may be the original full reference video or a compressed version of the video.

Up-sampled PSNR (uPSNR), is defined as the PSNR where the corrupting noise is measured by comparing the original signal (the video portion at full resolution (both spatial resolution and frame rate)) with an up-sampled decoded video portion (being the video portion encoded and then decoded and then up-sampled to that full resolution). The up-sampling process typically involves the selection of an interpolation function, for example, but not limited to, bicubic, lanczos, spline, which may result in some marginal differences in the reconstructed picture.

The inventors have found that uPSNR is a good predictor of subjective quality when comparing different lossy encoding/resampling configurations for the same content. However, when comparing across different content (e.g. a high-motion scene vs. a static scene), uPSNR poorly correlates with subjective quality.

The inventors have also found that for a given video content, since uPSNR is a good predictor of the subjective quality, it may be used as a reference to normalize a video quality metric such as QP or a complexity/motion-normalized video quality metric based on QP such as CRF across different resolutions. For example, suppose we have two videos of different encoding/resampling configurations, one at the same full resolution as the original video, and the other at a lower resolution. If both videos have the same uPSNR, they may be regarded as having equal subjective quality. The (complexity/motion-normalized video) quality metric value of the full-resolution video may then be used as the quality score for the lower-resolution video as well in order to provide a resolution normalized video quality metric.

The resolution normalized M value may be used with live HTTP-based adaptive streaming (HAS) or any other suitable streaming or content provisioning application. In HAS, a video stream is typically divided into segments of a few seconds each. Each segment of the source video is pre-encoded into multiple bitrate representations and stored at a server. Each client adaptively fetches the bitrate segments according to the bandwidth available for downloading content. The different bitrate representations may be generated from the original video via lossy encoding (essentially, by applying a coarser quantizer to the transform coefficients), resampling (including both lowering spatial resolution and lowering frame rate, followed by up-sampling before displaying on screen), or by any suitable combination of the above.

Another aspect of HAS is that, since video is typically delivered over lossless TCP, the only types of distortion generally expected in the video delivered are those caused by lossy encoding and resampling. Thus, the video quality score can be pre-computed at the same time as encoding the video portion.

The resolution normalized M value, may be determined for each bitrate segment. The resolution normalized M value is a full-reference metric and utilizes the original lossless video or any relatively high quality lightly encoded video in lieu of the original lossless video (available at the encoder) and is typically robust against varying video content, lossy encoding and resampling.

Calculation of the resolution normalized video metric is now described in more detail with reference to FIGS. 2-5.

Figure 2:
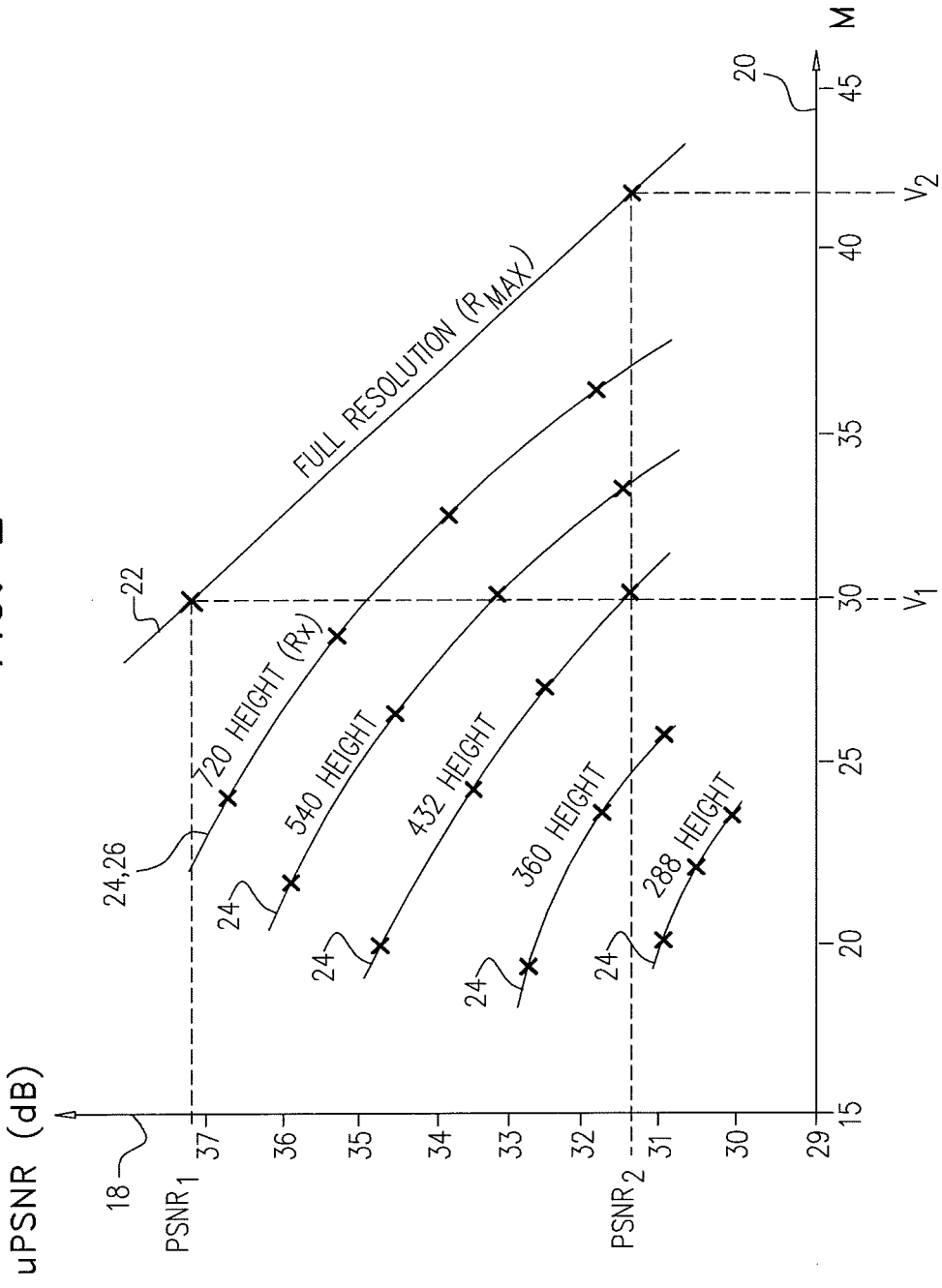
FIG. 2 is a chart showing a mapping between uPSNR and M at various resolutions for use in the system of FIG. 1.

Reference is now made to FIG. 2, which is a chart showing mappings 22, 24 between uPSNR (axis 18) and M (axis 20) at various resolutions for use in the system 10 of FIG. 1.

The mappings shown in FIG. 2 are for a particular video portion where M is complexity-motion normalized QP.

FIG. 2 shows a mapping 22 between uPSNR and M at full resolution, Rmax.

FIG. 2 also shows other mappings 24 between uPSNR and M at resolutions less than full resolution, for example, a mapping 26 between uPSNR and M at resolution Rx (Rx being less than Rmax) is shown. The other mappings 24 are shown for the sake of completeness. However, it will be seen that the other mappings 24 do not need to be determined in order to determine the resolution normalized M value.

The mapping 22 approximates a straight line mapping and therefore, the mapping between uPSNR and M at the full resolution (Rmax) may be determined based on determining two uPSNR values ($PSNR_1$ and $PSNR_2$) and corresponding values for M ($V_1$ and $V_2$). It will be appreciated that the mapping between uPSNR and M at full resolution is the same as the mapping between PSNR and M at full resolution because the video portion does not need to be up-sampled since it is already at full resolution.

Where the mapping between uPSNR and M at full resolution, Rmax, is expected to be a non-linear relationship then the mapping between uPSNR and M at full resolution, Rmax, may be determined based on determining a suitable number of values of uPSNR and corresponding M values and then applying a suitable curve fitting algorithm in order to determine the mapping between uPSNR and M at full resolution.

Figure 3:
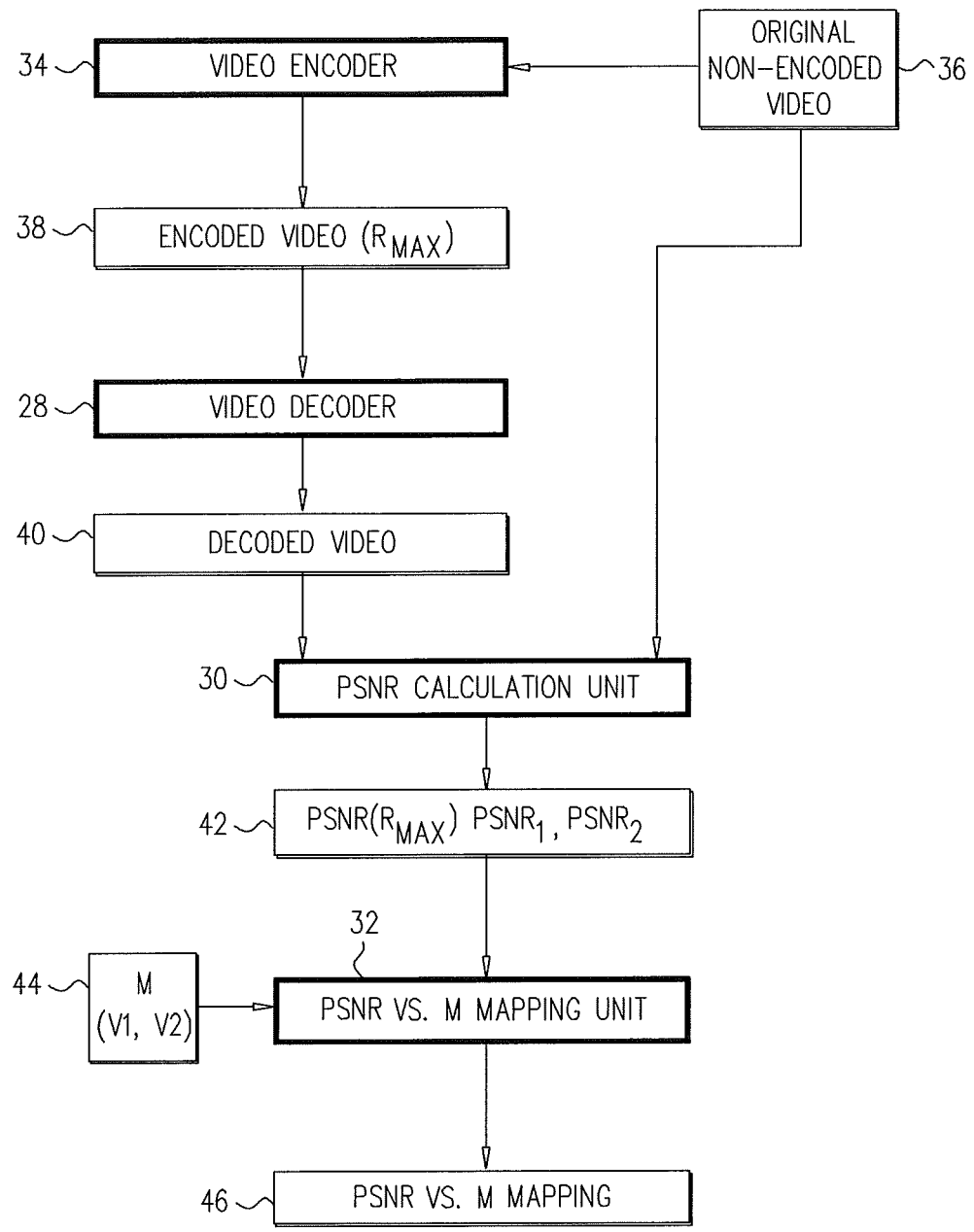
FIG. 3 is a flow chart type view showing a method of determining the mapping between PSNR and M at full resolution for use in the system of FIG. 1.

Reference is now made to FIG. 3, which is a flow chart type view showing a method of determining the mapping 22 (FIG. 2) between PSNR and M at full resolution for use in the system 10 of FIG. 1.

The processing performed by processor 12 (FIG. 1) of the video processing system 10 (FIG. 1) may be divided into sub-processors including a video encoder 34, a video decoder 28, a PSNR calculation unit 30, a PSNR vs. M mapping unit 32. Some or all of the sub-processors may be combined into a single processing unit or be implemented as separate processing units operationally connected to each other.

The video encoder 34 is operative to encode a video portion 36 at a first video quality and at full resolution Rmax yielding an encoded video portion 38.

The video decoder 28 is operative to decode the encoded video portion 38 yielding a decoded video portion 40.

The PSNR calculation unit 30 is operative to receive the decoded video portion 40 and the video portion 36 and calculate a first peak signal to noise ratio, $PSNR_1$ (block 42) for the encoded version of the video portion 36 encoded at the first video quality and Rmax. The calculation of $PSNR_1$ includes comparing the decoded video portion 40 (being a decoded version of the encoded version of the video portion 36) with the (original or lightly compressed) video portion 36 to determine the corrupting noise. It should be noted that each PSNR value calculation described herein includes comparing a decoded version of the encoded version of the video portion 36 to the (original or lightly compressed) video portion 36.

Similarly, each uPSNR value calculation described herein includes comparing an up-sampled (to Rmax) decoded version of the encoded version of the video portion 36 to the video portion 36.

The processor 12 is operative to determine a first M value, $V_1$, for the encoded version of the video portion 36 encoded at the first video quality and Rmax based on an encoding parameter such as QP and optionally on encoding parameters such as complexity and motion of the encoded video portion 38 (block 44).

The above steps are repeated wherein, the video portion 36 is also encoded by the video encoder 34 at a second video quality, at full resolution Rmax, and then decoded by the video decoder 28 and then processed by the PSNR calculation unit 30 to calculate a second peak signal to noise ratio, $PSNR_2$ (block 42) for the encoded version of the video portion 36 encoded at the second video quality and Rmax.

The processor 12 is also operative to calculate a second M value, $V_2$, for the encoded version of the video portion 36 encoded at the second video quality and Rmax (block 44).

The above processing supplies the values $PSNR_1$ and $PSNR_2$ and the corresponding values $V_1$ and $V_2$.

The PSNR vs. M mapping unit 32 is operative to determine the mapping (block 46) between the peak signal to noise ratio, PSNR, and the video quality metric, M, for the encoded version of the video portion 36 when the encoded version is encoded at full resolution Rmax based on $V_1$, $V_2$, $PSNR_1$ and $PSNR_2$.

The example of FIG. 3 assumes that there is a straight line mapping between PSNR and M at full resolution Rmax. If the relationship is non-linear, more than two points may be needed to provide a sufficient mapping. If the relationship is non-linear, a linear relationship may be assumed in some cases for simplicity purposes but may distort the calculated metrics.

It should be noted that the mapping between PSNR and M is determined for a specific video portion and is repeated for each video portion that a quality metric needs to be calculated for.

Figure 4:
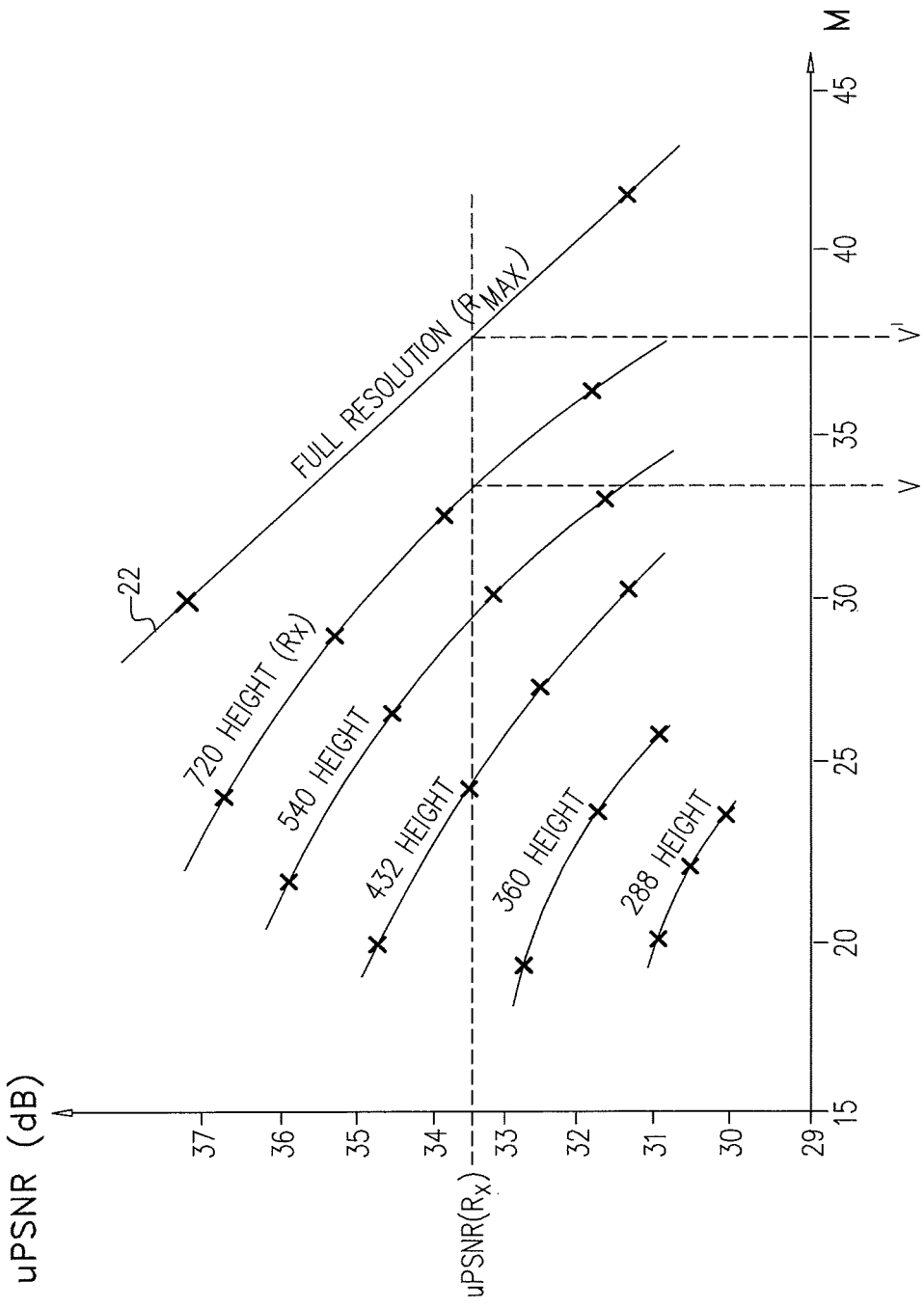
FIG. 4 is a view of the chart of FIG. 2 showing looking up uPSNR(Rx) value in the mapping to determine a resolution normalized M value.

Reference is now made to FIG. 4, which is a view of the chart of FIG. 2 showing looking up uPSNR(Rx) value in the mapping to determine a resolution normalized M value.

FIG. 4 shows the mapping 22 between uPSNR and M at full resolution, Rmax, for a particular video portion.

The particular video portion is encoded at a resolution Rx and has a uPSNR value uPSNR(Rx) and a (complexity-motion normalized) metric M value of V.

The (complexity-motion normalized) metric M value V is resolution normalized by looking up the value uPSNR(Rx) in the mapping 22 between uPSNR and M at full resolution Rmax, giving the value V' which is the resolution normalized value of V.

The calculation of V' is now described in more detail with reference to FIG. 5.

Figure 5:
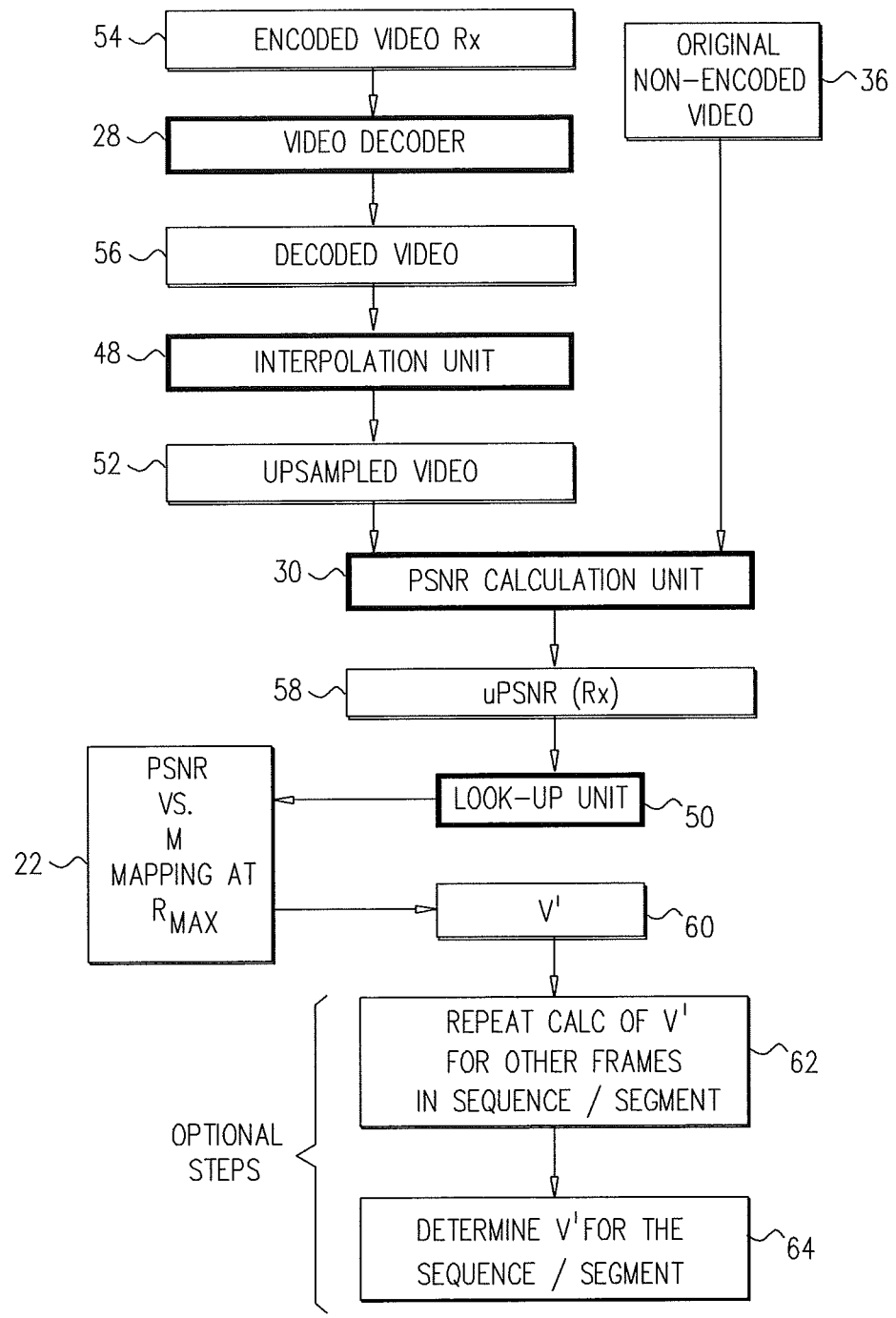
FIG. 5 is a flow chart type view showing a method to determine the resolution normalized M value of FIG. 4.

Reference is now made to FIG. 5, which is a flow chart type view showing a method to determine the resolution normalized M value, V' of FIG. 4.

As described above with reference to FIG. 3, the processing performed by processor 12 (FIG. 1) of the video processing system 10 (FIG. 1) may be divided into sub-processors. In addition to the sub-processors listed in FIG. 3, the sub-processors may include an interpolation unit 48 and a look-up unit 50. Some or all of the sub-processors may be combined into a single processing unit or be implemented as separate processing units operationally connected to each other.

The processor 12 (FIG. 1) is operative to determine an up-sampled peak signal to noise ratio, uPSNR(Rx), of an up-sampled decoded video portion 52 based on the steps below.

The video decoder 28 is operative to receive an encoded video portion 54 (encoded at resolution Rx) and decode the encoded video portion 54 yielding a decoded video portion 56. The interpolation unit 48 is operative to up-sample the decoded video portion 56 to the full resolution Rmax yielding the up-sampled decoded video portion 52. Therefore, the up-sampled decoded video portion 52 derives from the video portion 36 being encoded at a resolution Rx, which is less than the full resolution Rmax, yielding the encoded video portion 54 and the encoded video portion 54 being decoded and then up-sampled to the full resolution Rmax.

Up-sampling typically includes changing a higher spatial resolution and/or changing to a higher frame rate. Changing to a higher frame rate could be implemented by generating intermediate frame(s) between existing frames based on temporal interpolation, and compared with an original video portion.

The PSNR calculation unit 30 is operative to receive, by being read from the memory 14 (FIG. 1) the video portion 36 and the up-sampled decoded video portion 52. The PSNR calculation unit 30 is operative to calculate the uPSNR(Rx) value based on comparing the inputs including the video portion 36 and the up-sampled decoded video portion 52 (block 58).

The processor 12 (FIG. 1) is operative to read, from the memory 14 (FIG. 1), the mapping 22 between the peak signal to noise ratio, PSNR, and the video quality metric, M, for the encoded version of the video portion 36 encoded at full resolution Rmax as depicted in FIGS. 2 and 4.

The look-up unit 50 is operative to read the value uPSNR (Rx), from the memory 14 (FIG. 1), and look-up a value, V' (block 60), mapping to uPSNR(Rx) in the mapping 22 between PSNR and M at full resolution, Rmax. V' represents a resolution normalized M value of the encoded video portion 54 encoded at the resolution Rx.

The video portion 36 and encoded video portion 54 may be a single video frame comprised in a video sequence (for example, a bitrate segment in an adaptive bitrate (ABR) system). The video sequence includes a plurality of video frames (not shown). The processor 12 (FIG. 1) is optionally operative to determine a resolution normalized M value for an encoded version of each of the plurality of video frames (each encoded at the same resolution Rx) using the method described above with reference to FIGS. 2-5 for each of the video frames (block 62). It should be noted that a new mapping 22 may be determined for each of the video frames using the method described above with reference to FIG. 3. The processor 12 (FIG. 1) is operative to calculate a resolution normalized M value for an encoded version of the video sequence based on the resolution normalized M value of each of the plurality of video frames (block 64), for example by determining an average of all the resolution normalized M values for the video frames of the video sequence or take a percentile score (e.g. 10%-worst score) over all the video frames within the video sequence.

Figure 6:
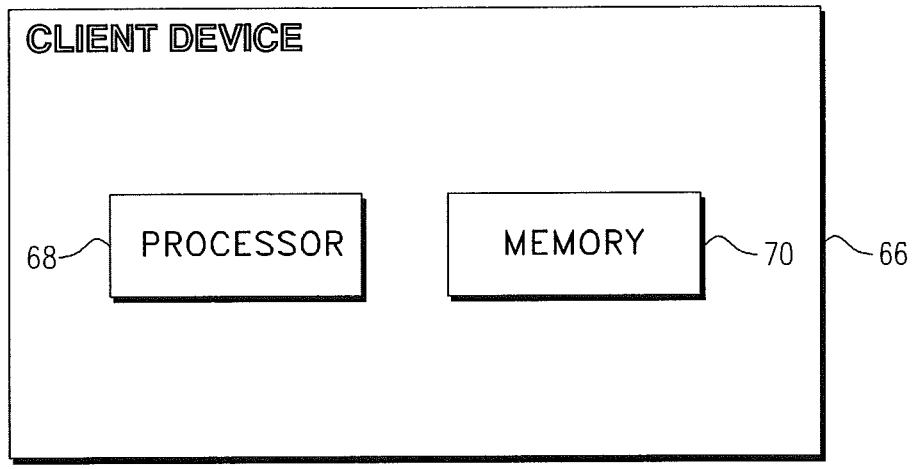
FIG. 6 is a block diagram view of a client device constructed and operative in accordance with an embodiment of the present invention.

Reference is now made to FIG. 6, which is a block diagram view of a client device 66 constructed and operative in accordance with an embodiment of the present invention.

The client device 66 includes a processor 68 and a memory 70 to store data used by the processor 68.

Figure 7:
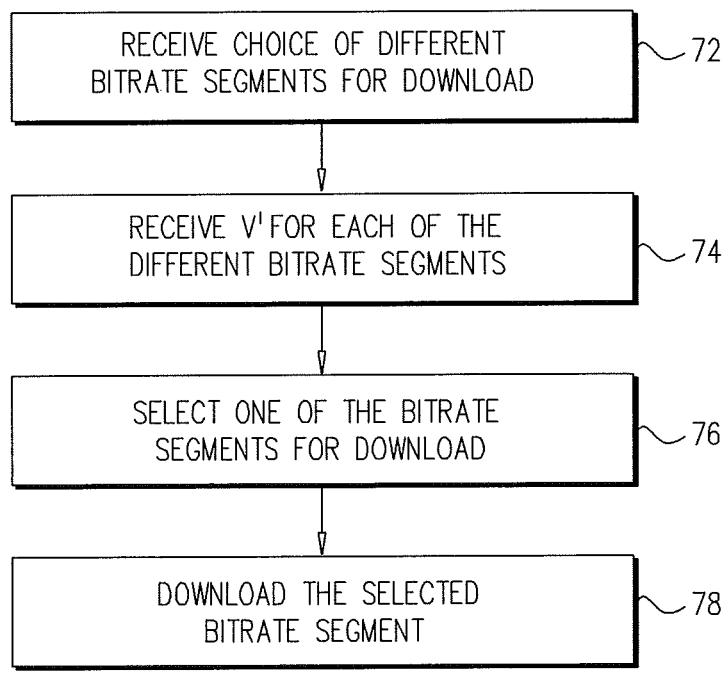
FIG. 7 is a flow chart showing a method of selecting bitrate segments in the client device of FIG. 6.

Reference is now made to FIG. 7, which is a flow chart showing a method of selecting bitrate segments in the client device 66 of FIG. 6.

The processor 68 (FIG. 6) is operative to receive a choice of a plurality of different bitrate segments for download (block 72).

The processor 68 (FIG. 6) is operative to receive a resolution normalized video quality metric V' for each of the different bitrate segments (block 74) from the video processing system 10 or any other system which prepared and/or stored the resolution normalized video quality metric. The resolution normalized video quality metric V' for each of the different bitrate segments is determined by the method described above with reference to FIGS. 1-5.

The processor 68 (FIG. 6) is operative to select one of the different bitrate segments for download based on the resolution normalized video quality metric V' for each of the different bitrate segments (block 76).

The processor 68 (FIG. 6) is operative to download the selected one of the different bitrate segments (block 78).

Figure 8:
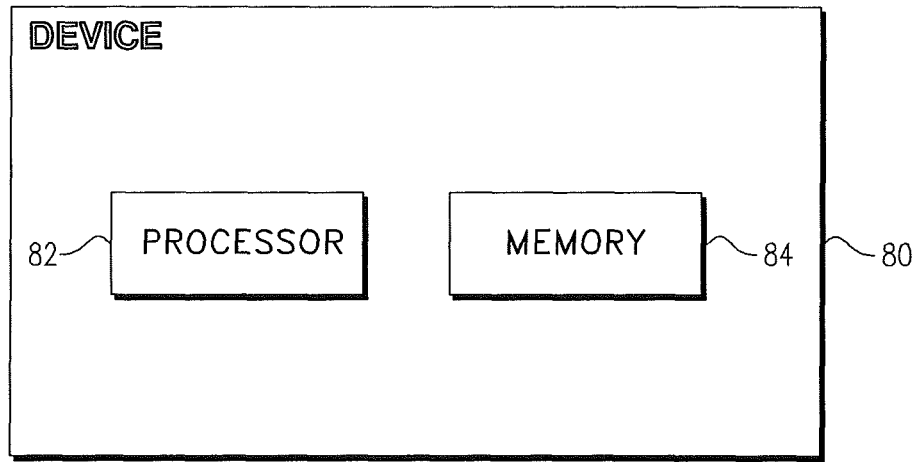
FIG. 8 is a block diagram view of a device constructed and operative in accordance with an embodiment of the present invention.

Reference is now made to FIG. 8, which is a block diagram view of a device 80 constructed and operative in accordance with an embodiment of the present invention.

Figure 9:
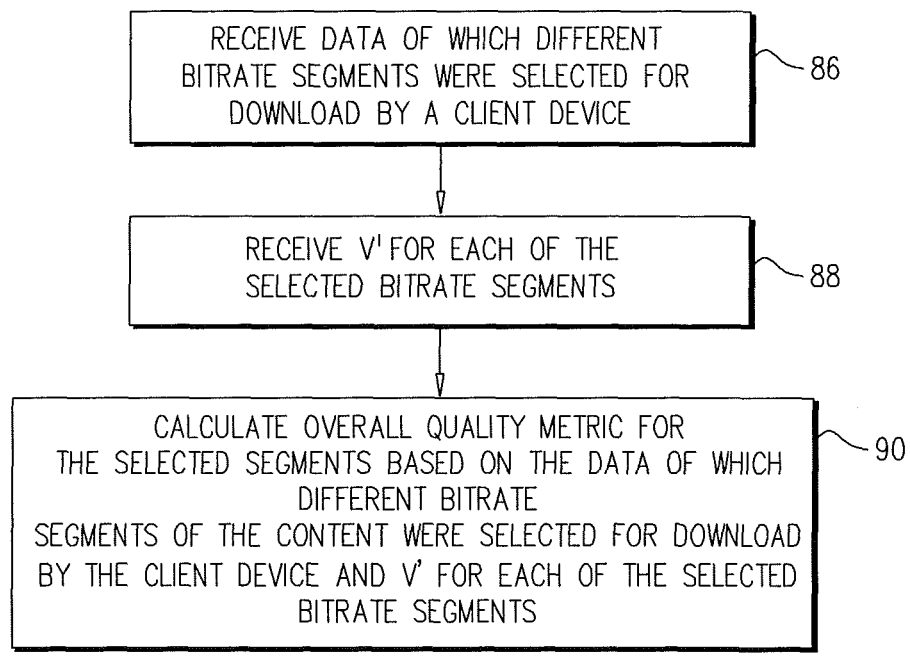
FIG. 9 is a flow chart showing a method of calculating a video quality metric for the segments selected by the client device of FIG. 6.

The device 80 includes a processor 82 and a memory 84 to store data used by the processor 82. The device 80 is operative to calculate video quality metrics for the video rendered by client devices including the client device 66. The device 80 may be implemented in a content server or in another device Reference is now made to FIG. 9, which is a flow chart showing a method of calculating a video quality metric by the device 80 of FIG. 8 for the segments selected by the client device 66 of FIG. 6.

The processor 82 of the device 80 (FIG. 8) is operative to receive data of which different bitrate segments of content were selected for download by the client device 66 of FIG. 6 (block 86).

The processor 82 of the device 80 (FIG. 8) is operative to receive a resolution normalized video quality metric V' for each of the selected bitrate segments (block 88). The resolution normalized video quality metric V' for each of the selected bitrate segments being determined by the method described above with reference to FIGS. 1-5.

The processor 82 of the device 80 (FIG. 8) is operative to calculate an overall quality metric (for example, but not limited to, arithmetic mean or percentile) based on the data of which different bitrate segments of the content were selected for download by the client device and the resolution normalized video quality metric for each of the selected bitrate segments (block 90).

In practice, some or all of the functions described hereinabove may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A video processing system comprising: a processor; and a memory to store data used by the processor, wherein the processor is operative to:
   read, from the memory, a mapping between a peak signal to noise ratio, PSNR, and a video quality metric, M, for an encoded version of a first video portion encoded at a full resolution Rmax;
   read, from the memory, an up-sampled peak signal to noise ratio, uPSNR(Rx), of an up-sampled decoded video portion, the up-sampled decoded video portion deriving from the first video portion being encoded at a resolution Rx, which is less than the full resolution Rmax, yielding an encoded video portion, the encoded video portion being decoded and then up-sampled to the full resolution Rmax; and
   lookup a value, V', that maps to uPSNR(Rx) in the mapping, V' representing a resolution normalized M value of the encoded video portion encoded at the resolution Rx.

2. The system according to claim 1, wherein the first video portion is a video frame comprised in a video sequence including a plurality of video frames, wherein the processor is operative to:
   determine a resolution normalized M value for an encoded version of each of the plurality of video frames; and
   calculate a resolution normalized M value for an encoded version of the video sequence based on the resolution normalized M value of each of the plurality of video frames.

3. The system according to claim 1, wherein the processor is operative to:
   receive the first video portion;
   read, from the memory, the up-sampled decoded video portion; and
   calculate uPSNR(Rx) based on comparing inputs including the first video portion and the up-sampled decoded video portion.

4. The system according to claim 1, wherein the processor is operative to:
   receive the encoded video portion encoded at resolution Rx;
   decode the encoded video portion yielding a decoded video portion; and
   up-sample the decoded video portion to the full resolution Rmax yielding the up-sampled decoded video portion.

5. The system according to claim 1, wherein the processor is operative to determine the mapping between the peak signal to noise ratio, PSNR, and the video quality metric, M, for the encoded version of the first video portion when the encoded version is encoded at full resolution Rmax.

6. The system according to claim 5, wherein the processor is operative to:
   encode the first video portion at a first video quality, at full resolution Rmax;
   calculate a first peak signal to noise ratio, PSNR1, for the encoded version of the first video portion encoded at the first video quality and Rmax;
   calculate a first M value, V1, for the encoded version of the first video portion encoded at the first video quality and Rmax;
   encode the first video portion at a second video quality, at full resolution Rmax;
   calculate a second peak signal to noise ratio, PSNR2, for the encoded version of the first video portion encoded at the second video quality and Rmax; and
   calculate a second M value, V2, for the encoded version of the first video portion encoded at the second video quality and Rmax;
   determine the mapping between the peak signal to noise ratio, PSNR, and the video quality metric, M, for the encoded version of the first video portion when the encoded version is encoded at full resolution Rmax based on V1, V2, PSNR1 and PSNR2 as input.

7. The system according to claim 1, wherein the M is a complexity-motion normalized quality metric or a quantization parameter.

8. A video processing method comprising:
   reading, from a memory, a mapping between a peak signal to noise ratio, PSNR, and a video quality metric, M, for an encoded version of a first video portion encoded at full resolution Rmax;
   reading, from a memory, an up-sampled peak signal to noise ratio, uPSNR(Rx), of an up-sampled decoded video portion, the up-sampled decoded video portion deriving from the first video portion being encoded at a resolution Rx, which is less than the full resolution Rmax, yielding an encoded video portion, the encoded video portion being decoded and then up-sampled to the full resolution Rmax; and
   looking-up a value, V', that maps to uPSNR(Rx) in the mapping, V' representing a resolution normalized M value of the encoded video portion encoded at the resolution Rx.

9. The method according to claim 8, wherein the first video portion is a video frame comprised in a video sequence including a plurality of video frames, wherein the method further comprises:
   determining a resolution normalized M value for an encoded version of each of the plurality of video frames; and
   calculating a resolution normalized M value for an encoded version of the video sequence based on the resolution normalized M value of each of the plurality of video frames.

10. The method according to claim 8, wherein the M is a complexity-motion normalized quality metric or a quantization parameter.

11. A client device, comprising: a processor; and a memory to store data used by the processor, wherein the processor is operative to:
   receive a choice of a plurality of different bitrate segments for download;
   receive a resolution normalized video quality metric for each of the different bitrate segments, the resolution normalized video quality metric for each of the different bitrate segments being determined by the steps of the method of claim 8;

select one of the different bitrate segments for download based on the resolution normalized video quality metric for each of the different bitrate segments; and download the selected one of the different bitrate segments.

12. The client device according to claim 11, wherein the M is a complexity-motion normalized quality metric or a quantization parameter.

13. A device, comprising: a processor; and a memory to store data used by the processor, wherein the processor is operative to:

receive data of which different bitrate segments of content were selected for download by a client device;

receive a resolution normalized video quality metric for each of the selected bitrate segments, the resolution normalized video quality metric for each of the selected bitrate segments being determined by the steps of the method of claim 8; and calculate an overall quality metric based on the data of which different bitrate segments of the content were selected for download by the client device and the resolution normalized video quality metric for each of the selected bitrate segments.

14. The device according to claim 13, wherein the M is a complexity-motion normalized quality metric or a quantization parameter.

15. A method comprising:

receiving a choice of a plurality of different bitrate segments for download;

receiving a resolution normalized video quality metric for each of the different bitrate segments, the resolution normalized video quality metric for each of the different bitrate segments being determined by the steps of the method of claim 8;

selecting one of the different bitrate segments for download based on the resolution normalized video quality metric for each of the different bitrate segments; and downloading the selected one of the different bitrate segments.

16. The method according to claim 15, wherein the M is a complexity-motion normalized quality metric or a quantization parameter.

17. A method comprising:

receiving data of which different bitrate segments of content were selected for download by a client device;

receiving a resolution normalized video quality metric for each of the selected bitrate segments, the resolution normalized video quality metric for each of the selected bitrate segments being determined by the steps of the method of claim 8; and calculating an overall quality metric based on the data of which different bitrate segments of the content were selected for download by the client device and the resolution normalized video quality metric for each of the selected bitrate segments.

18. The method according to claim 17, wherein the M is a complexity-motion normalized quality metric or a quantization parameter.

* * * * *